(12) United States Patent
Kim et al.

(10) Patent No.: US 6,206,311 B1
(45) Date of Patent: Mar. 27, 2001

(54) BAITCAST FISHING REEL WITH DISCRETING BACKLASH CONTROL

(75) Inventors: Hyunkyu Kim, Broken Arrow; Roy E. Stiner, Owasso, both of OK (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 09/476,471

(22) Filed: Dec. 30, 1999

(51) Int. Cl.⁷ ................................................ A01K 89/02
(52) U.S. Cl. ..................................... 242/288; 242/304
(58) Field of Search ............................ 242/245, 288, 242/289, 303, 304; 188/267; 310/93, 105

(56) References Cited

U.S. PATENT DOCUMENTS

| | | | |
|---|---|---|---|
| 4,535,954 | * 8/1985 | Worth et al. | 242/288 |
| 4,549,703 | * 10/1985 | Atobe | 242/288 |
| 4,830,308 | * 5/1989 | Puryear | 242/288 |
| 4,940,194 | * 7/1990 | Young | 242/288 |
| 5,984,221 | * 11/1999 | Kim | 242/289 |
| 5,996,920 | * 12/1999 | Yamaguchi | 242/288 |
| 6,003,798 | * 12/1999 | Kim | 242/288 |
| 6,065,700 | * 5/2000 | Kim | 242/288 |

\* cited by examiner

Primary Examiner—Donald P. Walsh
Assistant Examiner—Emmanuel M. Marcelo
(74) Attorney, Agent, or Firm—Fellers, Snider, Blankenship, Bailey & Tippens, P.C.

(57) ABSTRACT

A braking apparatus for a fishing reel comprising: a side cover; a brake dial rotatably positioned in the side cover such that the brake dial is externally accessible and operable from outside of the side cover, the brake dial having a plurality of predetermined positions; at least one interacting boss provided on either the brake dial or the side cover; and a resilient boss operably provided on the other of the brake dial or the side cover for interaction with the interacting boss such that, as the dial is rotated in a given direction to a point where the resilient boss contacts an interacting boss, further rotation in that direction is inhibited until the user exerts sufficient force on the dial to deform the resilient boss thereby allowing the resilient boss to traverse the interacting boss.

9 Claims, 4 Drawing Sheets

BAITCAST FISHING REEL WITH DISCRETING BACKLASH CONTROL

BACKGROUND OF THE INVENTION

1. Field of the Invention

This invention relates generally to braking systems for fishing reels. More particularly, but not by way of limitation, the present invention relates to adjustable braking systems for baitcast fishing reels.

2. Background

Baitcast fishing reels are well known in the art. A baitcasting reel will typically comprise: a split frame having a pair of opposing side plates; a foot extending from the frame for attaching the reel to a fishing rod; a line spool, rotatably positioned between the frame side plates, for retrieving and holding a fishing line; a spool shaft, on which the spool is secured, having ends extending through the frame side plates; a pinion gear (typically a helical gear) provided on the spool shaft; a manually rotatable crank handle; a gear train and crankshaft assembly mechanically linking the crank handle to the spool shaft pinion gear; a level-wind mechanism which transverses the spool during winding to ensure that the fishing line is properly wound along the length of the spool; a clutch mechanism for preventing reverse rotation of the crank handle; an exterior actuator (typically a thumb lever) for disengaging the pinion gear from the spool shaft to allow the spool to rotate freely during casting; and a spool drag or spool braking mechanism.

In most cases, right and left side covers are removably attached to the frame side plates for housing the reel's various operating mechanisms. A right-handed baitcasting reel (i.e., a reel designed for a right-handed user) will typically be structured such that the spool drag or spool braking mechanism is housed under the left side cover, the crank handle is rotatably mounted outside of the right side cover, and the crankshaft, gear train, pinion gear, clutch, and anti-reverse mechanism are housed under the right side cover. As will be understood by those skilled in the art, a left-handed version of generally any baitcasting reel can be produced by simply reversing the arrangement and structure of the reel's components such that the left-handed reel is a mirror image of the right-handed version of the reel.

Spool drag or spool braking systems are commonly used in baitcasting reels to alleviate line backlashing (also referred to as "line nesting") problems. Because they utilize transversely-oriented spools which rotate during casting, baitcasting reels are more prone to backlashing problems than are spinning reels and spin casting reels. Such problems result primarily from the rotational momentum carried by the spool during casting. The most common types of drag/braking mechanisms used in baitcasting reels are magnetic drag brakes and centrifugal (friction) braking systems.

Many environmental factors, as well as personal preferences, affect the amount of braking force which may be appropriate for a given cast. This has led to the development of adjustable braking systems for baitcasting reels. For example, U.S. Pat. No. 5,108,042, incorporated herein by reference, discloses an adjustable, magnetic drag mechanism which exerts a magnetic drag force on the end of the reel spool. The magnetic force slows rotation of the spool during casting. The mechanism disclosed in the '042 patent comprises: a magnet carrier ring having a plurality of magnets attached thereto; an axially movable cam disc to which the magnet carrier ring is secured; and an adjustment dial projecting through a recess in the left cover. The dial includes cams which are operably associated with the cam disc for selectively moving the carrier ring toward and away from the end of the spool in order to adjust the amount of magnetic drag force applied to the spool.

U.S. Pat. No. 5,950,949, also incorporated herein by reference, discloses a centrifugal braking system wherein the braking force exerted by the system can be selectively adjusted. Like the magnetic system of U.S. Pat. No. 5,108,042, the centrifugal braking system of the '949 patent employs an externally adjustable brake dial having a plurality of smooth cam ramps provided thereon. In the centrifugal braking system of the '949 patent, the cam ramps provided on the brake dial convert rotary movement of the dial into axial movement of a brake ring to thereby selectively adjust the number of braking pieces which can contact the brake ring.

Each of the dial cam systems of U.S. Pat. Nos. 5,108,042 and 5,950,949 provides an almost infinite number of possible braking positions within the available rotational range of the dial. Thus, such systems can provide a high degree of adjustability. However, they can also require significant experimentation both to identify preferred braking positions and to relocate such positions when making desired adjustments. Additionally, when used in centrifugal braking devices of the type disclosed in the '949 patent, such systems do not ensure that the braking surface is always properly positioned such that the brake elements are prevented from rubbing and/or binding against the leading edge of the brake ring.

It is thus an object of the present invention to provide an adjustable braking system for a baitcast fishing reel which includes a discreting adjustment mechanism to provide an appropriate number of discrete braking ranges while allowing fine adjustment within each range when appropriate.

It is a further object of the invention to provide an adjustable braking system whereby a fisherman can easily return to a previous braking position.

SUMMARY OF THE INVENTION

The present invention provides a fishing reel braking apparatus which satisfies the needs and alleviates the problems discussed above. The inventive apparatus preferably comprises a brake dial rotatably positioned in a reel side cover such that the brake dial is externally accessible and operable from outside of the side cover, the brake dial having a plurality of predetermined discrete positions; at least one resilient, deformable boss provided on either the brake dial or the side cover; and at least one interacting boss located on the other of the brake dial or the side cover for interaction with the deformable boss such that, when the dial is rotated, the deformable boss will contact the interacting boss, thereby preventing further rotational movement of the dial until the user exerts sufficient force on the dial to temporarily deform the deformable boss and thereby allow the dial to rotate past the point of interference. There are thus provided at least two, and preferably three, predetermined discrete ranges of braking force.

In another aspect of the present invention there is provided a fishing reel braking apparatus incorporating an adjustable braking assembly wherein a discreting mechanism defines ranges of breaking force such that the brake dial allows fine adjustments between a plurality of predetermined discrete positions. In the preferred embodiment the brake dial includes a circular dial plate which is provided with a serrated edge along an arc concentric with the dial plate. A clicker spring cooperates with the serrated edge to provide an audible indication as the brake dial is rotated.

In another aspect of the present invention, an aperture is provided in the deformable boss to set the force required to deform the deformable boss to a desired level.

Further objects, features, and advantages of the present invention will be apparent to those skilled in the art upon examining the accompanying drawings and upon reading the following description of the preferred embodiments.

DETAILED DESCRIPTION OF THE PREFERRED EMBODIMENT

Figure 1:
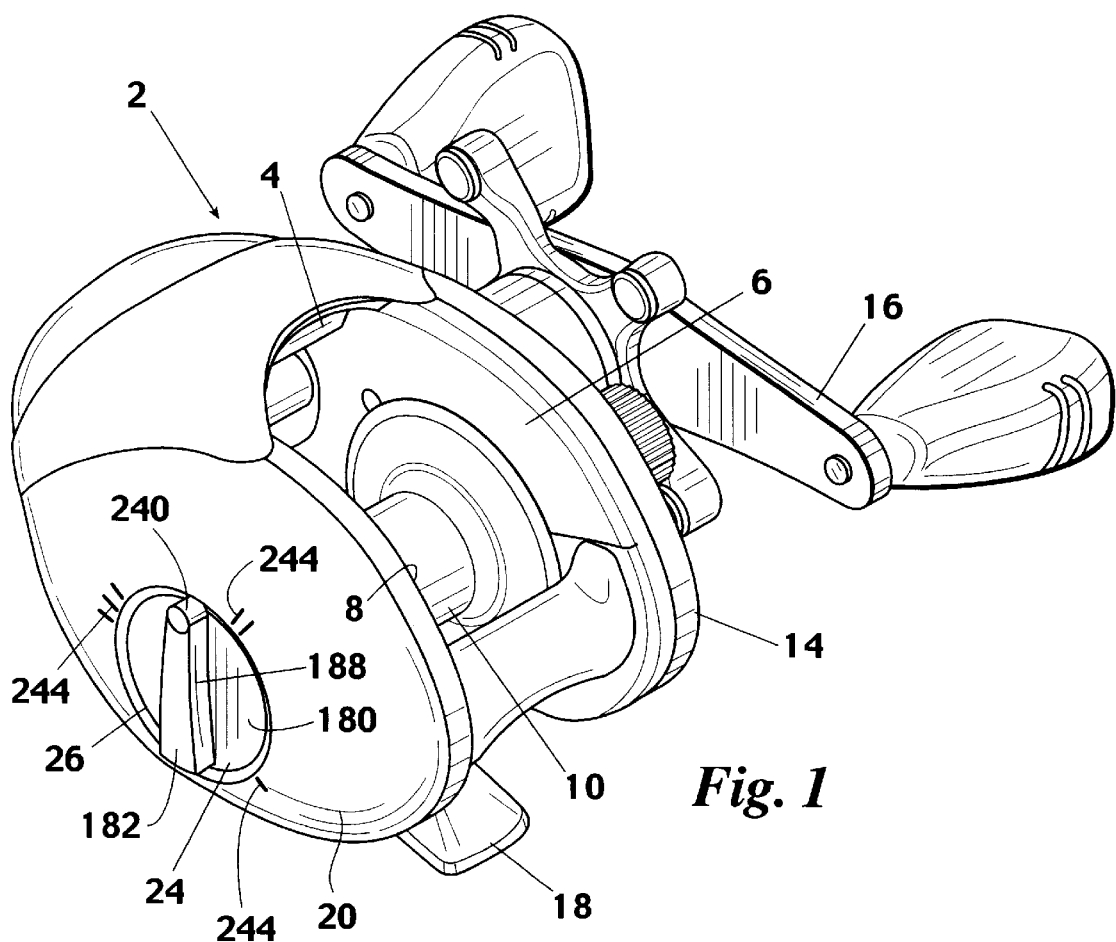
FIG. 1 provides a perspective view of a baitcasting reel 2 having the discreting backlash control apparatus incorporated therein.

The preferred embodiment of the inventive, discreting backlash control apparatus (as incorporated in a baitcasting reel 2) is shown in FIGS. 1–5. As best seen in FIG. 1 baitcasting reel 2 comprises: a split frame 4 having a right side plate 6 and a left side plate 8; a line spool 10 rotatably mounted in frame 4 between side plates 6 and 8; a spool shaft 11 (FIG. 3B) extending through spool 10; a right side cover 14 secured over side plate 6; a crank handle 16, operably extending from right cover 14, for rotating spool 10; a reel foot 18, provided on the bottom of frame 4, for attaching reel 2 to a fishing rod; and a left side cover 20 secured over left side plate 8. When reel 2 is assembled, the brake dial 24 of inventive brake apparatus projects through a circular aperture 26 formed in left cover 20.

Although for convenience, the inventive apparatus is shown herein and described as incorporated in a right-handed baitcasting reel, the inventive apparatus is equally adaptable for use in left-handed reels. As will be understood by those skilled in the art, a left-handed version of generally any baitcasting reel can be produced by simply reversing the arrangement and structure of the reel's components such that the left-handed reel is a mirror image of the right-handed version of the reel.

Figure 2:
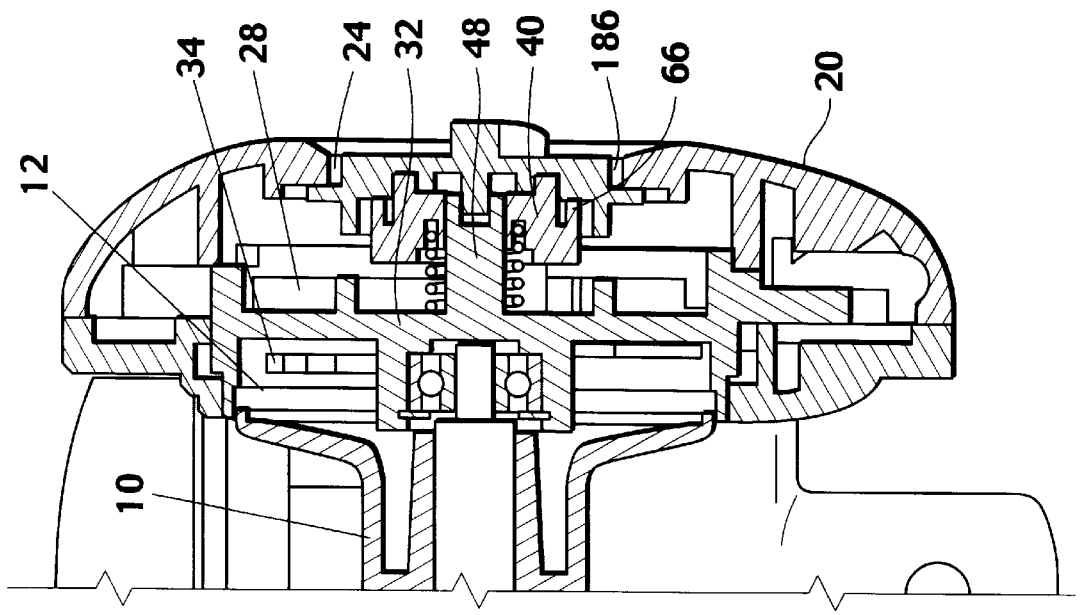
FIG. 2 provides a cutaway view of the left side assembly of baitcasting reel 2.
Figure 3A:
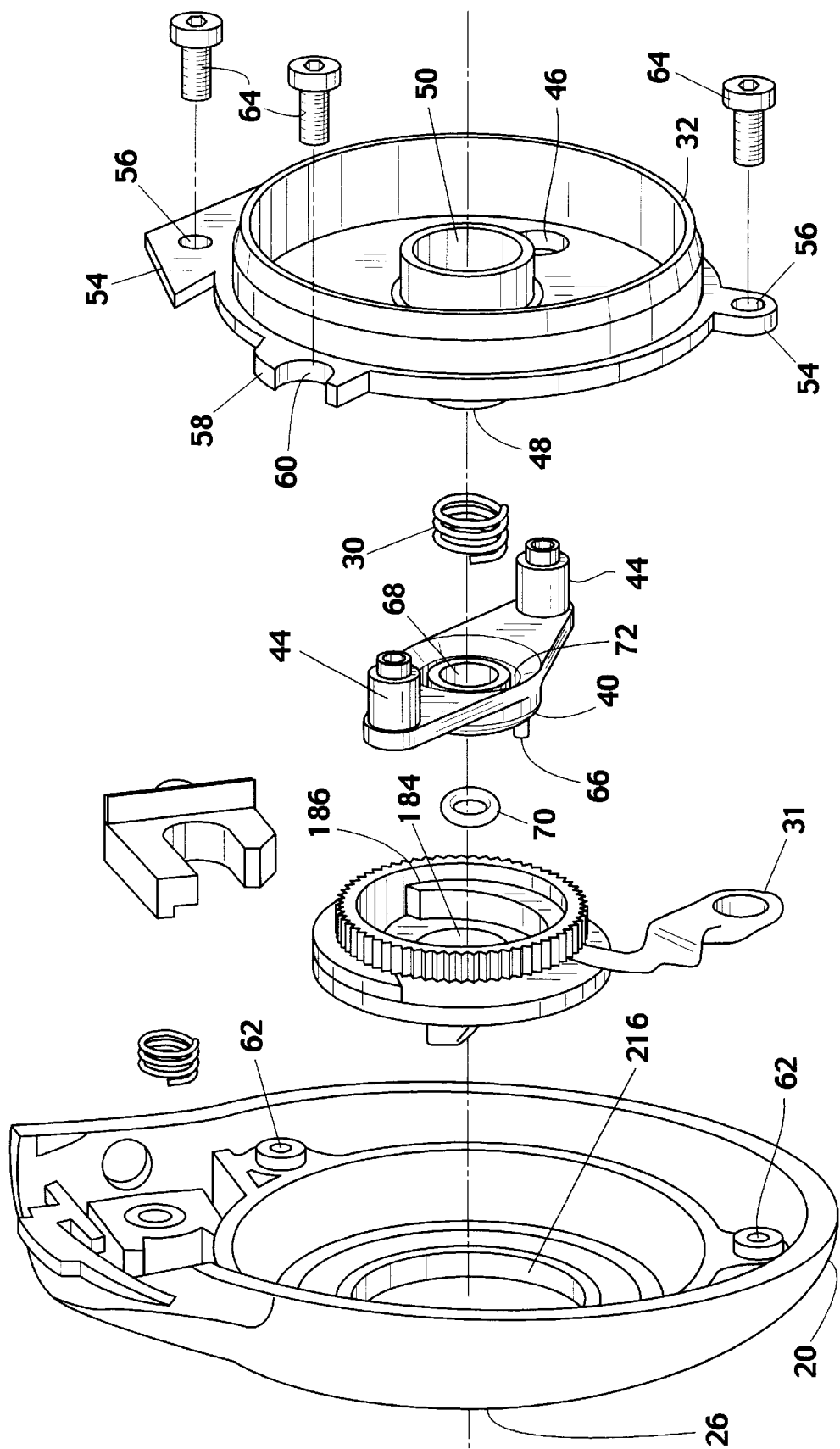
FIGS. 3A and 3B provide an exploded perspective view of the left side assembly of reel 2.
Figure 3B:
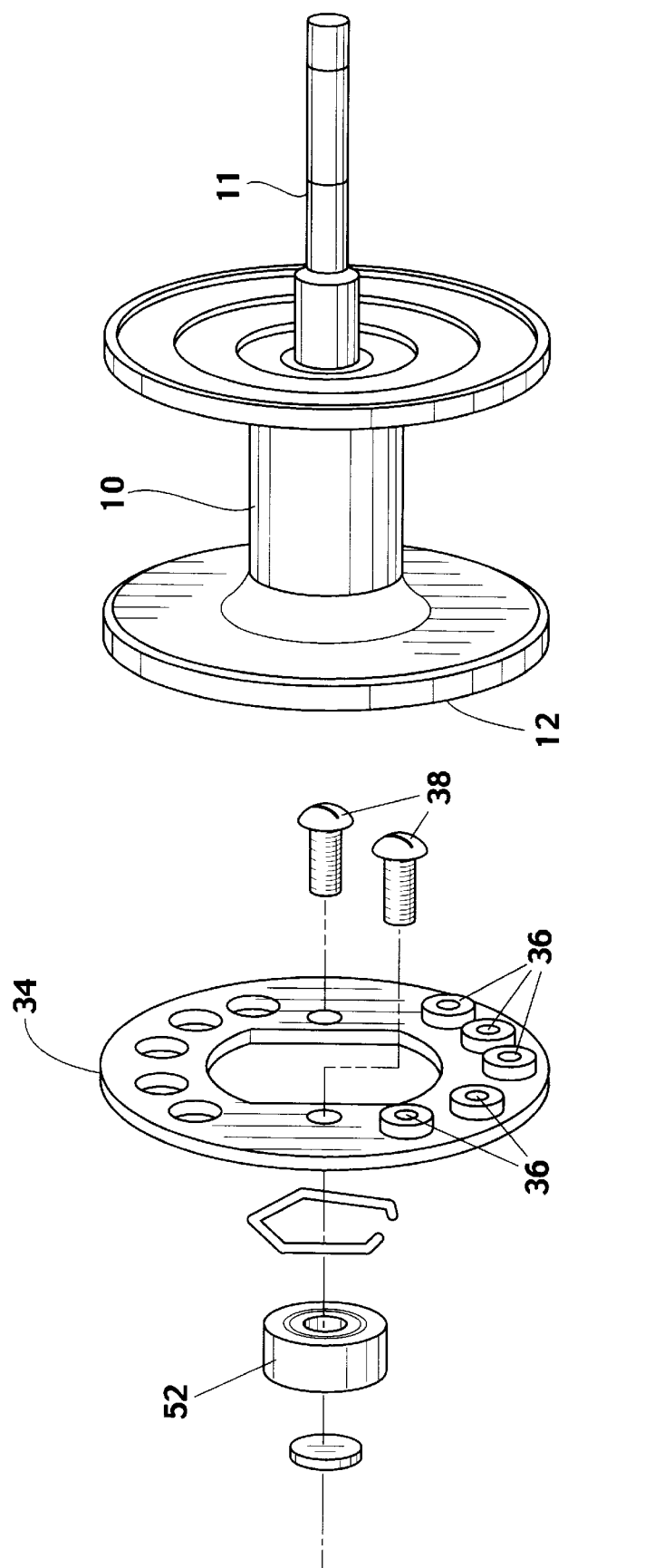

Referring now to FIGS. 3A and 3B, the inventive braking apparatus preferably comprises: inventive brake dial 24 operably retained in side cover 20; and a brake assembly, such as, for example, a magnetic brake assembly 28 (FIG. 2). It should be understood that although the inventive apparatus is shown herein and described as incorporated in a baitcasting reel having a magnetic braking assembly, it is equally adaptable for use in a baitcasting reel having an adjustable centrifugal braking assembly such as the braking assembly described in U.S. Pat. No. 5,950,949 previously incorporated by reference.

The exemplary magnetic brake assembly 28 includes a movable magnet carrier ring 34 carrying a plurality of permanent magnets 36 thereon and a cam follower 40 for interacting with brake dial 24 to move magnet carrier ring 34 in response to adjustments made by the user.

As is commonly the case with baitcasting reels, reel 2 includes an interior spool cover 32 comprising: a cylindrical interior cavity 50 for holding a spool shaft bearing or bushing 52; a plurality of (preferably two) radially projecting ears 54; apertures 56 provided through radial ears 54; and a radially projecting, partial ear structure 58 having a semicircular notch 60 formed in the outer end thereof. Apertures 56 and notch 60 are sized and positioned to receive internally-threaded bosses 62, provided in the interior of side cover 20, such that spool cover 32 can be secured to side cover 20 by means of bolts or screws 64.

As used herein, the terms "outer" and "outwardly facing" describe features facing and/or positioned away from end 12 of line spool 10. The terms "inner" and "inwardly facing", on the other hand, describe features facing and/or positioned toward end 12.

The left end of spool shaft 11 is retained in bearing 52 which is held in spool cover 32 to axially fix the position of spool 10. Therefore, as magnet carrier ring 34 is positioned axially toward and away from the left end 12 of spool 10, the magnetic force acting on spool 10 as a result of permanent magnets 36 is likewise varied, thereby varying the drag force acting upon the spool.

Figure 4:
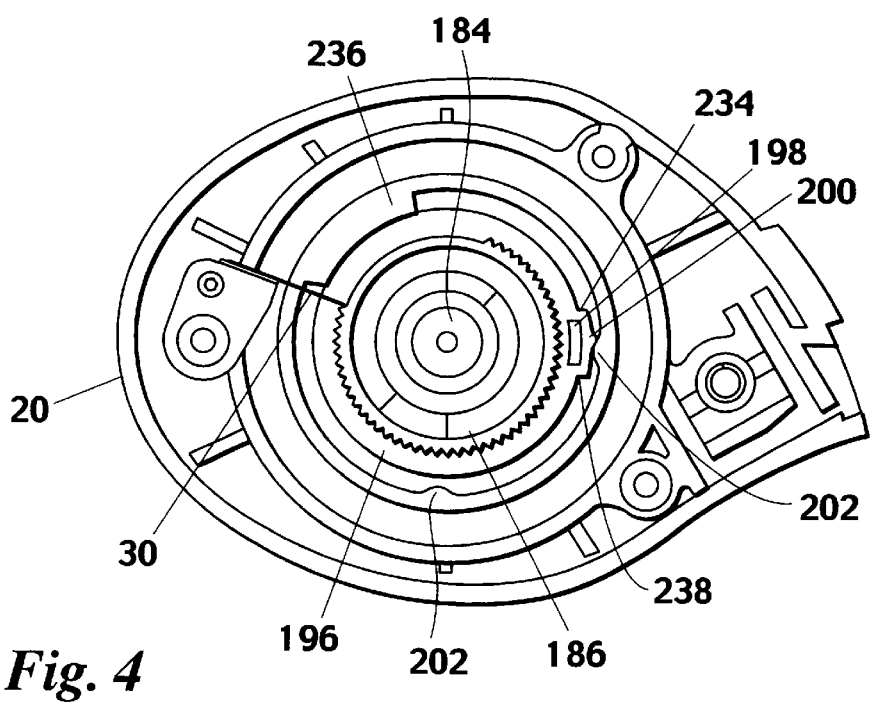
FIG. 4 provides an elevational interior view of the left side cover 20 of reel 2.
Figure 5:
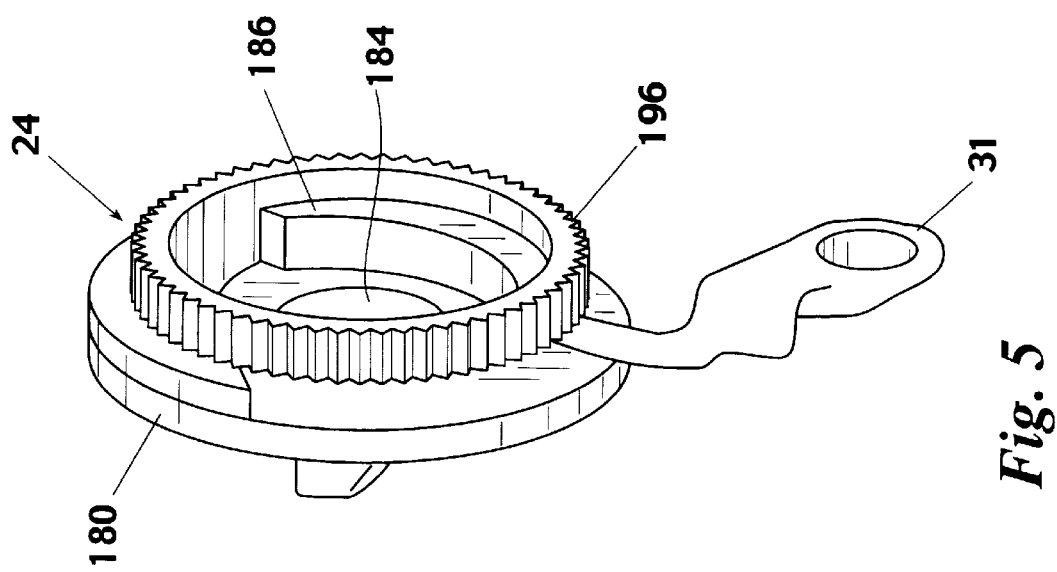
FIG. 5 provides a perspective view of inventive brake dial 24.

As best seen in FIGS. 1, 4, and 5, brake dial 24 preferably comprises: a circular dial plate 180; a grasping structure 182 provided on the outer face of dial plate 180; a cylindrical cup 184 extending from the center of the inner face of dial plate 180 and sized for rotatably receiving cylindrical guide post 48 (FIG. 3A); a curved cam 186 projecting from the inner face of dial plate 180; a serrated edge 196 located on the inner face of dial plate 180 along an arc concentric with dial plate 180; and a resilient, deformable boss 200 (FIG. 4) provided on the edge of dial plate 180 having an aperture 198 therein to allow deformation of boss 200 while operably traversing one or more interacting bosses 202 provided in left side cover 20. Preferably, brake dial 24 is formed as a unitary structure from a resilient, elastomeric material such that deformable boss 200 is integral to dial plate 180.

Cam 186 is preferably arranged in a circular pattern around cylindrical cup 184. Cam 186 interacts with cam interacting member 66 of cam follower 40 to thereby selectively move magnet carrier ring 34 (FIG. 2) axially toward and away from spool end 12 through a series of braking positions.

Grasping structure 182 projects outwardly from the outer face of dial plate 180 and includes an exterior wall 188 and an indexing pointer 240.

As best seen in FIG. 3A, brake dial 24 is rotatably held between (a) an internal radial shoulder 216 formed in side cover 20 around circular aperture 26 and (b) the guidepost 48 of spool cover 32.

As depicted in FIGS. 2, 3A, and 3B, the inventive braking apparatus is preferably assembled such that brake dial 24 is positioned in cover aperture 26; cam follower 40 is positioned inwardly of dial 24 such that cam ramp 186 provided on dial 24 operably interacts with interacting member 66 provided on follower 40; retainer guidepost 48 extends outwardly through cam follower bore 68 and is received in interior dial cup 184; cam follower bosses 44 slidably extend through apertures 46 provided in spool cover 32; magnet carrier ring 34 is reciprocatably secured between spool cover 32 and spool 10 by attaching carrier ring 34 to cam follower bosses 44 using bolts 38; and clicker spring 31 interacts with serrated edge 196 to provide an audible indication as the dial is rotated. The assembled braking apparatus preferably also includes both a friction reducing O-ring 70 provided in interior dial cup 184, for facilitating the rotation of dial 24, and a spring 30 positioned around cover guidepost 48 between spool cover 32 and cam follower 40. The outer end of spring 30 is received in cam follower groove 72 and exerts a continuous, outward biasing force on cam follower 40 whereby cam ramps 186 of dial 24 and interacting members 66 of cam follower 40 are maintained in operative contact.

When the brake dial 24 is rotated to its full clockwise position, the interacting member 66 of cam follower 40 will be located on the lowest portion of cam 186, placing magnet carrier ring 34 in its fully outward, minimum braking position. As the user turns brake dial 24 counterclockwise, the sloped cam 186 acts against interacting member 66 to push interacting member 66 and magnet carrier ring 34 inward. Finally, as the user continues to rotate dial 24 to its full counterclockwise position, interacting member 66 will be located on the highest portion of cam 186, placing the magnet carrier ring 34 in its fully inward, maximum braking position.

As best seen in FIG. 4, as the user rotates dial 24, deformable boss 200 will come into contact with an interacting boss 202. To rotate the dial 24 beyond the point of contact, the user must exert enough force to deform deformable boss 200 sufficiently to allow it to traverse the interacting boss 202. Deformation of deformable boss 200 is facilitated by aperture 198 located in boss 200. Preferably, there are provided two interacting bosses 202, thereby producing three discrete braking ranges. The beginning of a low braking range is defined when the dial 24 is rotated to its full clockwise, minimum braking position. The low range ends at the point where deformable boss 200 contacts the first interacting boss 202 as the dial 24 is rotated counterclockwise. As the user rotates the dial 24 past the first interacting boss, the brake assembly 28 is placed in its medium braking range. As the user continues to rotate the dial 24 counterclockwise, the medium range ends as deformable boss 200 contacts the second interacting boss 202. The high braking range begins as the dial 24 is rotated past the second interacting boss 202 and the high range ends when the dial 24 is turned to its full counterclockwise, maximum braking position.

Preferably, the brake dial 24 is adjustable within each of the three brake ranges. As the dial is adjusted within a range, clicker spring 31 will interact with serrated edge 196 to produce an audible indication of the dial movement as well as a tactile sensation.

It will be obvious to those skilled in the art that a single interacting boss 202 could be provided to produce two operating ranges (e.g., a high range and a low range), or multiple interacting bosses could be provided to produce a greater number of ranges. It will be further obvious to those skilled in the art that the individual, interacting bosses 202 could be located immediately adjacent to one another such that a plurality of discrete braking positions are defined by the interacting bosses rather than discrete ranges of braking positions.

Shoulders 234 and 238 on the sides of boss 200 operate to limit the rotation of brake dial 24 such that the cam 186 cannot be rotated past interacting member 66 when turning brake dial 24 in either direction. The rotational movement of brake dial 24 is limited in the clockwise direction by the abutment of shoulder 234 with stop 236 and is limited in the counterclockwise direction by the abutment of shoulder 238 with stop 236. Stop 236 is provided in the interior of side cover 20. Thus, the inventive braking system cannot be turned past either the above-mentioned "full braking position" or the above-mentioned "minimum braking position." The braking position of the inventive apparatus is preferably indicated by an index indicator 240 provided on the exterior of brake dial 24. Indicator 240 is preferably formed as a separate component so that indicator 240 may be of a different material or different color than brake dial 24. Preferably, index marks 244 are provided on the exterior of side cover 20 about aperture 26 to provide a visual indication to a fisherman of the current brake setting.

As will be understood by those skilled in the art, although the preferred embodiment of the inventive apparatus utilizes one cam 186 and one corresponding interacting member 66, the inventive apparatus could optionally utilize two, three, or more cams 186. Further, although the cam 186 of inventive brake dial 24 is of continuous slope, flat areas corresponding to discrete braking positions could also be used.

As also will be understood by those skilled in the art, although the above-described preferred embodiment of the inventive apparatus has been explained with reference to a magnetic braking assembly 28, other types of braking assemblies (e.g., a centrifugal braking assembly) could be employed in the present invention.

As will be further understood by those skilled in the art, equivalent operation and feel of the brake dial 24 could be achieved by forming the deformable boss 200 on the side cover 20 about aperture 26. Interacting bosses 202 could then be located on brake dial 24 such that interacting bosses 202 rotate with brake dial 24 for interaction with stationary deformable boss 200.

It will be further understood by those skilled in the art that the inventive apparatus can be employed in generally any type of baitcasting reel.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A braking apparatus for a fishing reel comprising:

a brake dial rotatably positioned in a side cover of said fishing reel such that said brake dial is externally accessible and operable from outside of said side cover; and at least one resilient, deformable boss operably positioned on one of said brake dial and said side cover for interaction with at least one interacting boss operably positioned on the other of said brake dial and said side cover, said deformable boss having a first sloped surface and a second sloped surface, wherein, as said brake dial is rotated from a first predetermined discrete range in a direction, when said first sloped surface contacts said at least one interacting boss, further rotation in said direction is inhibited until sufficient force is applied to said brake dial to deform said deformable boss thereby allowing said deformable boss to traverse said interacting boss to at least a second predetermined range, and as said deformable boss traverses a first side of said interacting boss, said first sloped surface will act against said interacting boss to urge rotation of said dial opposite said direction, and as said deformable boss traverses a second side of said interacting boss, said second sloped surface will act against said interacting boss to urge rotation of said brake dial in said direction, such that said brake dial will not remain in a position such that said deformable boss is in a deformed state, absent an external rotational force applied to said brake dial.

2. The braking apparatus of claim 1 wherein said first and second predetermined discrete ranges include:

a low braking force range; and a high braking force range.

3. The braking apparatus of claim 1 comprising a single deformable boss and two spaced-apart interacting bosses, thereby providing three predetermined discrete ranges.

4. The braking apparatus of claim 1 wherein said brake dial comprises a circular dial plate provided with a grasping structure and wherein said deformable boss is operably positioned on an edge of said dial plate.

5. The braking apparatus of claim 4 wherein an inner surface of said dial plate is further provided with a serrated edge along an arc concentric with said dial plate and further comprising a clicker spring in cooperating relationship with said serrated edge to provide an audible indication as said brake dial is rotated.

6. The braking apparatus of claim 1 wherein said deformable boss possesses at least one aperture therein.

7. The braking apparatus of claim 1 further comprising means for indicating said predetermined discrete ranges.

8. In a fishing reel of the baitcasting type, a brake apparatus comprising:

a brake dial rotatably positioned in a side cover of said fishing reel such that said brake dial is externally accessible and operable from outside of said side cover; and at least one resilient, deformable boss operably positioned on one of said brake dial and said side cover for interaction with at least one interacting boss operably positioned on the other of said brake dial and said side cover, said deformable boss having a first sloped surface and a second sloped surface, wherein, as said brake dial is rotated from a first predetermined range in a direction, when said at least one deformable boss contacts said at least one interacting boss, further rotation in said direction is inhibited until sufficient rotational force is applied to said brake dial to deform said deformable boss thereby allowing said deformable boss to traverse said interacting boss to achieve at least a second predetermined discrete range, and as said deformable boss traverses a first side of said interacting boss, said first sloped surface will act against said interacting boss to urge rotation of said dial opposite said direction, and as said deformable traverses a second side of said interacting boss, said second sloped surface boss will act against said interacting boss to urge rotation of said brake dial in said direction, such that said brake dial will not remain in a position such that said deformable boss is in a deformed state, absent an external rotational force applied to said brake dial.

9. The fishing reel of claim 8 wherein the baitcasting fishing reel is provided with a magnetic braking assembly including:

a movable magnet carrier ring in operable communication with said brake dial; and at least one permanent magnet retained on said magnet carrier ring.

* * * * *